June 13, 1944. M. O. SEARLE 2,351,155
CLUTCH ASSEMBLY FOR FERRULING MACHINES
Filed May 2, 1942 2 Sheets-Sheet 1
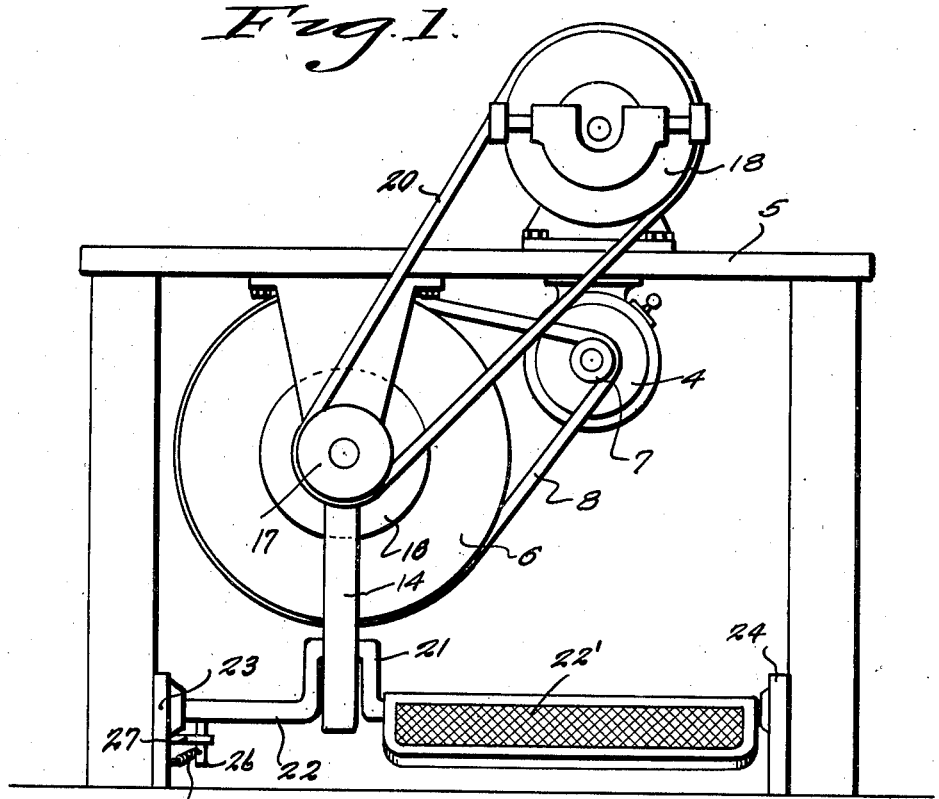
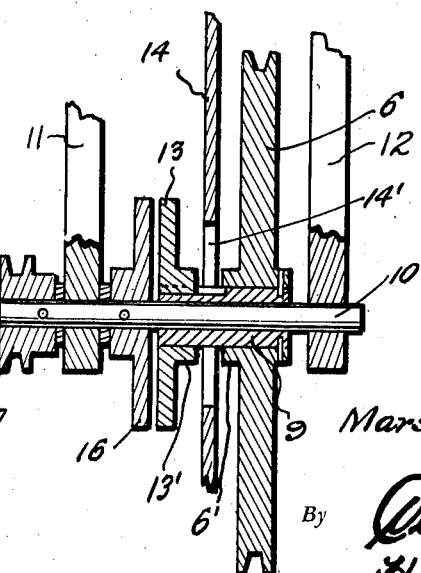
Inventor
Marshall O. Searle
By *Clarence A. O'Brien and Harvey B. Jacobson* Attorneys June 13, 1944.  M. O. SEARLE  2,351,155
CLUTCH ASSEMBLY FOR FERRULING MACHINES
Filed May 2, 1942  2 Sheets-Sheet 2
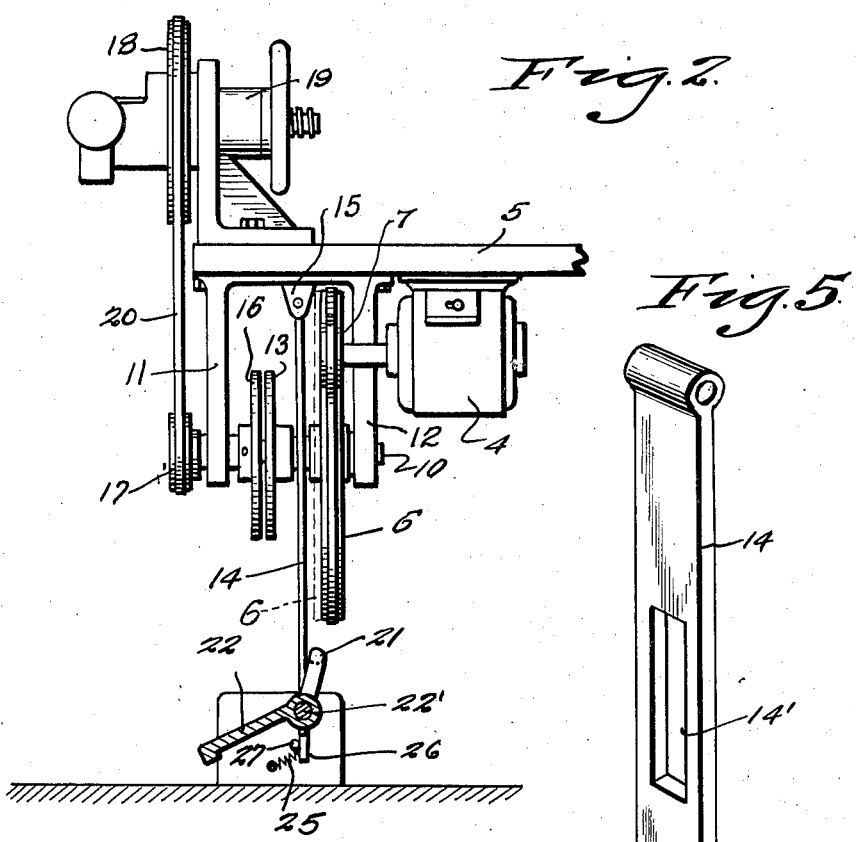
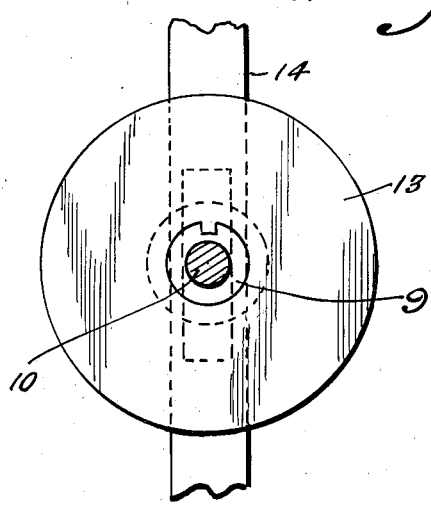
Inventor
Marshall O. Searle
By Clarence A. O'Brien
and Harvey B. Jacobson, Attorneys Patented June 13, 1944

2,351,155

UNITED STATES PATENT OFFICE 2,351,155

CLUTCH ASSEMBLY FOR FERRULING MACHINES

Marshall O. Searle, Beverly Hills, Calif.

Application May 2, 1942, Serial No. 441,491

3 Claims. (Cl. 192—99)

The present invention relates to new and useful improvements in a clutch assembly for transmitting power from an electric motor, or other source of power, to a ferrule beading machine.

One of the objects of the present invention is to provide a more uniform bead on the ferrule as it is crimped onto a conduit, such as a flexible conduit found in electrical systems, particularly aircraft electrical wiring systems.

Another object is to provide means for reducing the revolving speed of the beading dies of the ferruling machine, as related to the source of power, so that the ferruling operation may be more practicably controlled.

A further object is to provide a device of this character of simple and practical construction which is efficient and reliable in performance, relatively inexpensive to manufacture and install in operative position and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which—

Figure 1 is a front elevational view of the table on which the ferruling machine and clutch assembly is mounted.

Figure 2 is a fragmentary side elevational view with parts shown in section.

Figure 3 is a longitudinal sectional view through the clutch assembly.

Figure 4 is an end elevational view thereof, and

Figure 5 is a perspective view of the actuating lever for the clutch.

Referring now to the drawings in detail, wherein for the purpose of illustration I have disclosed a preferred embodiment of the invention, the numeral 4 designates a motor which is fixed to the underside of a suitable table or bench top 5 and is made to revolve a large pulley 6 from a small motor pulley 7 through a belt 8. The pulley 6 is keyed to a sleeve 9 adapted to freely rotate and slide on a shaft 10 journaled in brackets 11 and 12 secured to the underside of the table.

A clutch disk 13 is keyed to the sleeve 9 allowing sufficient clearance between said disk and the pulley 6 to accommodate a lever 14 therebetween, the lever being pivoted on a bracket 15 also secured to the underside of the table for the purpose of moving the sleeve 9 over the shaft 10. The lever 14 is provided with an opening 14' freely receiving the sleeve 9 and is positioned between the hub portions 6' and 13' on the pulley 6 and disk 13, respectively, for engaging said hubs upon opposite movement of the lever. In operating relation to the disk 13 is placed a similar disk 16 keyed to the shaft 10 and engagement of the disk 13 with the disk 16, it is seen, will cause the disk 16 and shaft 10 to rotate.

A pulley 17 is secured to an end of the shaft 10 and is caused to revolve with the shaft and in this manner transmits power to a pulley 18 on the ferruling machine 19 through the belt 20, said pulley 18 being fixed to the rotatable portion of the ferruling machine.

It is seen that when proper consideration has been given to the pulley sizes, in operating relation to each other, any predetermined number of revolutions per minute can be delivered to the ferruling machine from the source of power.

Engagement of the revolving disk 13 to the disk 16 on the shaft 10 is controlled by the action of a crank-like portion 21 of a treadle shaft 22 pivoted near the floor at 23 and 24. A spring 25 is connected to a pin 26 projecting laterally from the shaft 22 to return the shaft 22 and treadle 22' to its normal position to permit disengagement of the clutch disks as shown in Figure 1. A stop pin 27 is engaged by the pin 26 to limit action of the spring 25.

The disk 13 is moved out of engagement with the disk 16 by the action of the pulley 6 which shifts with the disk 13 on the shaft 10 into a position offset from the drive pulley 7 resulting in a distortion of the belt 8 and accordingly when pressure on the lever 14 is released to permit the latter to gravitate into its normal position, the belt 8 will straighten itself to move the pulleys into an alined position. The gravitating action of the lever 14 engaging the hub 6' of the pulley 6 also assists this action. In this manner it is possible to operate the ferruling machine while both hands of the workman remain free.

While it is to be noted that any number of transmission devices may be used to deliver and control power to the ferruling machine, the combination of pulleys and clutch, as shown in the drawings, provides adequate means for properly powering and controlling the ferruling machine.

It is believed the details of construction and manner of use of the device will be readily understood from the foregoing without further detailed explanation.

Having thus described the invention what I claim is:

1. A clutch device of the class described comprising a driven shaft having a pulley secured thereto, a drive shaft sleeved on the driven shaft and also having a pulley secured thereto, a clutch element secured to the drive shaft, a clutch element secured to the driven shaft, a lever disposed transversely behind the first clutch element and adapted for moving the latter into engagement with the second clutch element, a foot pedal including a rockably mounted shaft having a foot engaging plate projecting radially therefrom, and a crank on the last named shaft also disposed radially in a direction opposite to the plate, said crank being positioned upwardly at an inclined angle and at one side of the lever and operable to engage the clutch upon a depressing action of the foot plate.

2. A clutch device of the class described comprising a driven shaft, a drive shaft sleeved on the driven shaft, a clutch element secured to said drive shaft, and a second clutch element secured on the driven shaft, a manually operable pendulum type lever positioned behind the first-named clutch element for moving the first clutch element into engagement with the second clutch element, a drive pulley, a driven pulley secured to the drive shaft and normally disposed in the plane of the drive pulley when the clutch elements are disengaged, and a belt operatively connecting said pulleys said driven pulley being offset from the drive pulley by the engaging movement of said first clutch element to distort the belt and said distortion of the belt being operable to return the driven pulley and the first-named clutch element to their normal positions.

3. A clutch device of the class described comprising a driven-shaft, a drive shaft sleeved on the driven shaft, a clutch element secured to said drive shaft, a second clutch element secured on the driven shaft, a pendulum type lever disposed transversely behind the first clutch element and adapted to move the latter into engagement with the second clutch element upon an actuation of the lever in one direction, said lever gravitating in an opposite direction for disengaging the clutch elements, and a foot pedal having an upwardly inclined crank engaging the lower end of the lever and adapted to actuate the latter.

MARSHALL O. SEARLE.